United States Patent [19]

Rudi

[11] Patent Number: 4,491,890
[45] Date of Patent: Jan. 1, 1985

[54] DEVICE FOR POSITIONING A MAGNETIC HEAD IN A MAGNETIC TAPE DEVICE

[75] Inventor: Guttorm Rudi, Fjellhamar, Norway

[73] Assignee: Tandberg Data A/S, Oslo, Norway

[21] Appl. No.: 363,438

[22] Filed: Mar. 30, 1982

[30] Foreign Application Priority Data

Mar. 31, 1981 [DE] Fed. Rep. of Germany ....... 3112895

[51] Int. Cl.³ .................. G11B 5/55; G11B 21/08; G11B 5/48; G11B 21/24
[52] U.S. Cl. .................... 360/106; 360/97; 360/104
[58] Field of Search .............. 360/106, 97, 98, 99, 360/105, 109, 86, 93, 83; 74/27, 28, 29

[56] References Cited

U.S. PATENT DOCUMENTS

| | | | |
|---|---|---|---|
| 3,183,494 | 5/1965 | Welsh | 340/174.1 |
| 4,139,877 | 2/1979 | Townsend | 360/106 |
| 4,143,409 | 3/1979 | Iwabuchi | 360/105 |
| 4,313,141 | 1/1982 | Yanagida | 360/78 |
| 4,315,290 | 2/1982 | Kukreja | 360/106 |
| 4,323,939 | 4/1982 | Iftikar | 360/98 |

FOREIGN PATENT DOCUMENTS

| | | |
|---|---|---|
| 3339 | 8/1979 | European Pat. Off. . |
| 11831 | 11/1980 | European Pat. Off. . |
| 789085 | 1/1958 | United Kingdom . |
| 2022904A | 12/1979 | United Kingdom . |

*Primary Examiner*—R. Martin Kilgore
*Attorney, Agent, or Firm*—Hill, Van Santen, Steadman & Simpson

[57] ABSTRACT

A device for positioning a magnetic head in a magnetic tape device includes a head carrier on which the head is mounted, a spiral gearing connected to the head carrier, and an operating device for rotation of the spiral gearing. The head carrier is disposed in a support system comprised of a first bearing rigidly disposed in the housing frame, a bearing plate adjustably attached to the frame and which can be positioned relative to a reference surface, and a second bearing disposed at the bearing plate.

12 Claims, 4 Drawing Figures

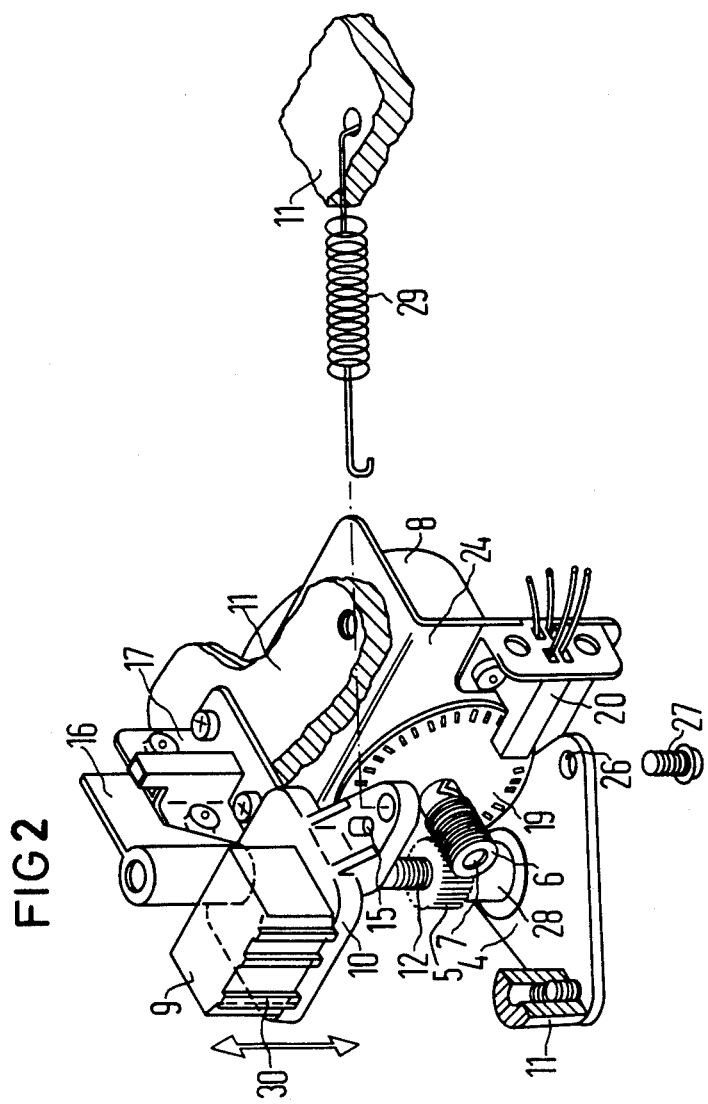
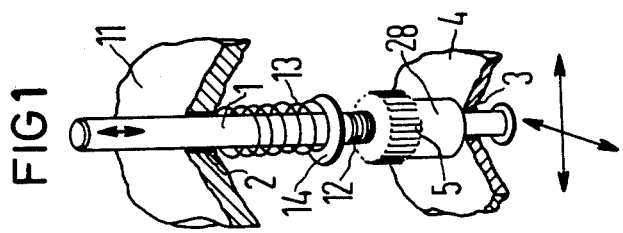

DEVICE FOR POSITIONING A MAGNETIC HEAD IN A MAGNETIC TAPE DEVICE

BACKGROUND OF THE INVENTION

The invention relates to a device for positioning a magnetic head with a head carrier in a magnetic tape device.

In sensing a magnetic tape with a magnetic head in a magnetic tape device, it is necessary for error-free and disruption-free operation that the magnetic head always be situated in a defined sensing position. This is particularly determined by the position of a sensing track on the magnetic tape. In case the magnetic head or respectively the magnetic head gap does not exhibit the required alignment, it must be positioned to the respective sensing track, particularly given multi-track operation.

SUMMARY OF THE INVENTION

It is an object of the invention to specify a device with which the magnetic head gap can be shifted precisely parallel to an imaginary straight line proceeding at right angles relative to the magnetic tape.

Given a device of the type cited above, this object is achieved in that the head carrier is disposed in a support mount which consists of a first bearing rigidly disposed on a housing frame, of a bearing plate which can be aligned according to a reference surface, of a second bearing disposed on the bearing plate, and of a spiral gearing disposed on the head carrier which exhibits an operating means.

The device has the advantage that, due to the design and the disposition of the operating means, it exhibits only a slight overall height. In a simple manner, the magnetic head or, respectively, the magnetic gap can be aligned in a precisely perpendicular manner relative to the reference surface. For this purpose, only a small number of individual parts or, respectively, a low mass need be moved, since the servicing means can be disposed so as to be at least partially independent of the magnetic head carrier.

BRIEF DESCRIPTION OF THE DRAWINGS

FIGS. 1 and 2 show a front view of the invention.

DESCRIPTION OF THE PREFERRED EMBODIMENTS

Figure 3:
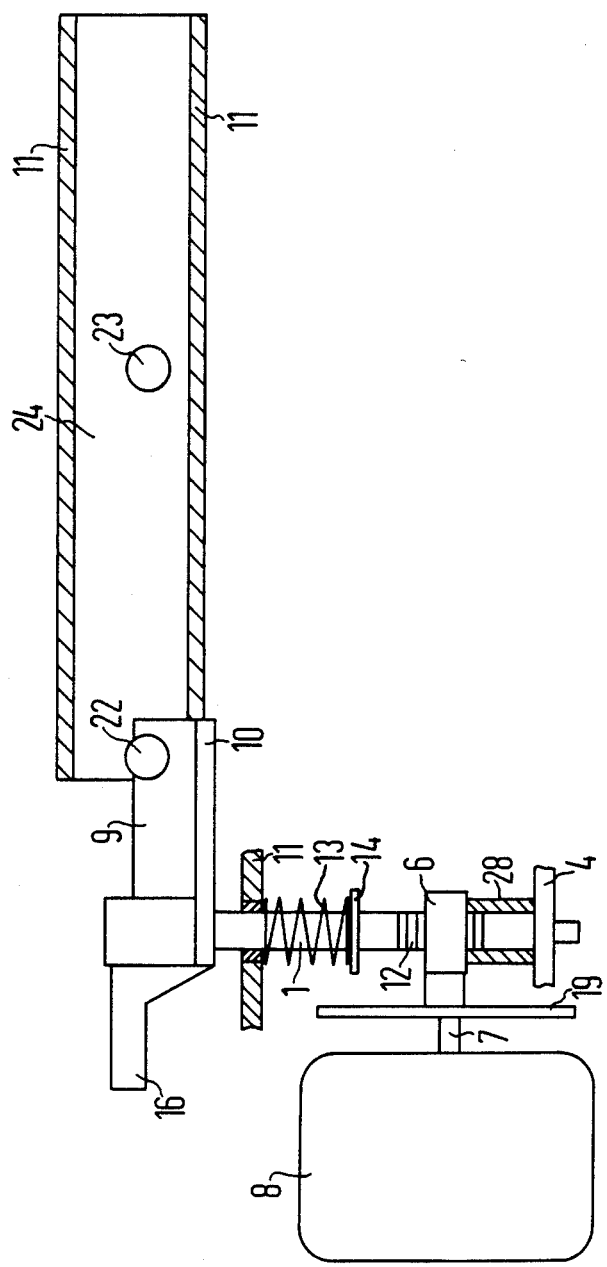
FIG. 3 shows a side view of the invention.

In FIG. 1, a first bearing 2 is rigidly disposed in a housing frame 11. A second bearing 3 is disposed on a movable bearing plate 4. A cylindrical head carrier 1 is guided by both bearings. A magnetic head 9, which is carried by the head carrier 1 above the housing frame 11, is not illustrated. Between the housing frame 11 and the bearing plate 4, the head carrier exhibits a ring 14 and a threaded spindle 12. The spindle 12 accepts a nut 28 which rests against the bearing plate 4. The threaded spindle and nut 28 form a spiral gearing 12, 28. This is provided with an adjustable engagement which consists of a first spring-tension means 13 disposed between the housing frame 11 and the ring 14.

An adjustment or operating means is provided in order to actuate the spiral gearing 12, 28. It can consist of a concentrically designed twist grip on the nut 28. The drawings illustrate a worm wheel 5 concentrically designed on the nut 28.

The bearing plate 4 can be moved in a plane parallel to a reference surface, this being indicated by two crossed arrows. By so doing, a precise vertical alignment of the head carrier 1 relative to the reference surface is possible. This requires a precise parallel alignment of the magnetic head 9 or, respectively, of a magnetic gap 30, to an imaginary line proceeding at right angles relative to a magnetic tape. A parallel displacement of the magnetic head 9 is possible by means of an actuation of the spiral gearing 12, 28. The actuation can ensue manually or by means of the adjustment or operating means described in greater detail in FIG. 2. The first spring-tension means 13 prevents flank clearance.

In FIG. 2, the magnetic head 9 is disposed on an element 10 which is secured to the head carrier 1. A disk is situated between the nut 28 and the bearing plate 4. The bearing plate 4 exhibits three bores 26 through which respective fastening elements 27 are positioned and by means of which it is secured to the housing frame 11. The bores 26 exhibit a greater diameter than the fastening elements 27, so that a lateral displacement of the bearing plate 4 is possible for purposes of alignment relative to the reference surface.

A shaft 7 which is connected to a motor 8 proceeds perpendicularly relative to the spiral gearing 12. The motor is designed as a dc motor. The shaft 7 exhibits a worm 6 for engagement in the worm wheel 12. A perforated disk 19 is disposed on the shaft between the worm 6 and the motor 8. It serves for generating a clock which is required for the control of the motor 8. The perforated disk 19 is sensed by a first sensing means 20 whose outputs are conducted to a motor control (not illustrated). Instead of the dc motor, the clock disk 19, and the first sensing means 20, a directly driven stepping motor can also be employed. The motor 8 and the first sensing means 20 are secured to a support mount.

In order to prevent a rotational movement of the element 10 around the center axis of the head carrier 1, the element 10 has an opening 15 through which a detent 21 disposed on the housing frame 11 is positioned. A second spring-tension means 29 is secured with one end to the element 10 and with its other end to the housing frame 11. It pulls the element 10 against the detent 21 and thus suppresses play.

An emergency stop device is provided which is connected to the motor control. The emergency stop device monitors the vertical movement of the magnetic head 9 and emits a signal to the motor control when the head carrier transgresses an upper or, respectively, lower limiting position. It consists of a position indicator 16 designed in flag-like fashion which is positioned between the transmitter and receiver of a second position sensor 17 designed as an opto-electronic sensor.

Figure 4:
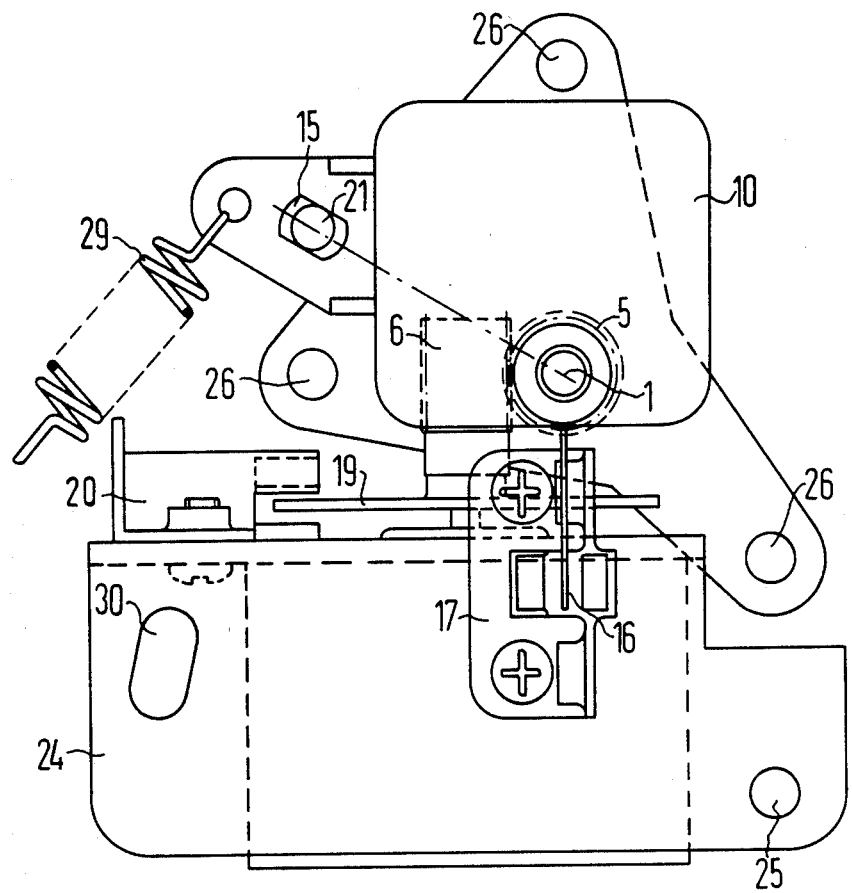
FIG. 4 shows a plan view of the invention.

In addition to the details described in FIGS. 1 and 2, FIG. 3 shows an insertion channel 24 of the magnetic tape device. At the inside, the insertion channel 24 exhibits three reference stops 22, 23, namely two front reference stops 22 and a back reference stop 23. Only one of the two front reference stops 22 is illustrated in the Figure. The three reference stops 22, 23 form the reference surface. A magnetic tape cassette introduced in the insertion channel 24 is aligned in accord with the reference surface. Thus, they determine the position of a magnetic tape relative to the magnetic head 9. In the plan view of FIG. 4, an oblong hole 30 as well as an opening 25 are illustrated in the support mount 31. The opening 25 serves for the acceptance of a shaft parallel to the spindle. The oblong hole 27 allows a rotation of the support mount 31 around the shaft and renders fastening in a desired position possible.

Hereafter, the positioning of the magnetic head is described on the basis of the Drawing Figures. As long as the fastening elements 27 are not fixed to the housing frame 11, the bearing plate 4 exhibits play. Thus, the head carrier 1 is only rigidly held in the bearing 2. By means of shifting the bearing plate 4, it is adjusted in a perpendicular direction relative to the reference surface. Subsequently, the bearing plate 4 is secured to the housing frame. Since the magnetic head 9 or, respectively, the magnetic gap 30 is secured to the head carrier, it is thus likewise aligned perpendicularly relative to the reference surface. Subsequently, the worm 6 is brought into engagement with the worm wheel 5 by means of turning the support mount 31 around the axle. A parallel displacement of the magnetic gap 30 ensues due to a movement of the head carrier 1. The motor 8 serves as a drive. A pre-positioning ensues by means of turning the spiral gearing 12, which is carried out by hand.

The emergency stop device is turned on when the motor control causes a vertical movement of the positioning axle which transgresses the upper or, respectively, lower limiting value of the vertical motion. The allowed horizontal displacement path is determined by the width of the position indicator 16. As long as it is situated between the transmitter and the receiver of the second sensing means, these limiting values have not been transgressed. The connection between the transmitter and receiver is interrupted. A signal triggering an emergency stop of the motor is emitted when the transmitter and receiver enter into a functional relationship with one another.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A device mounted on a housing frame for positioning a magnetic head relative to magnetic tape in a magnetic tape device comprising: a head carrier on which the head is mounted; a spiral gearing connected to the head carrier, and an operating means for the spiral gearing; the head carrier being disposed in a support means comprising a first bearing in which the head carrier rides rigidly disposed in the housing frame, a bearing plate adjustably attached to the housing frame and which can be positioned relative to a reference surface, and a second bearing in which the head carrier also rides disposed at the bearing plate such that by movement of the bearing plate relative to the housing frame, the magnetic head carrier can be aligned.

2. A device according to claim 1 wherein the spiral gearing comprises a threshold spindle portion of the head carrier riding in the first and second bearings and a rotatable nut means disposed on the bearing plate for acceptance of the threshold spindle.

3. A device according to claim 2 wherein the operating means includes a twist grip concentrically designed on the nut means.

4. A device according to claim 2 wherein the operating means includes a worm wheel concentrically designed on the nut means, a worm disposed on a shaft engaging the worm wheel, and a motor connected to the shaft.

5. A device according to claim 4 wherein a readjustment means permitting displacement of the shaft and the motor relative to the housing frame is provided.

6. A device according to claim 5 wherein the readjustment means comprises a support mount accepting the shaft and the motor, and which is rotatably secured to an axis lying parallel to the threaded spindle and which has securing means for locking the support mount in a desired position with respect to the housing frame.

7. A device according to claim 1 further including a stop means for preventing a rotational movement of the head carrier, and spring-tension means active between the head carrier and the housing frame.

8. A device according to claim 4 wherein the motor is a stepping motor.

9. A device according to claim 4 wherein the motor is a dc motor, a perforated disk is disposed on the shaft, and a first sensing means is provided for sensing rotation of the perforated disk.

10. A device according to claim 1 wherein an emergency stop device comprising a position indicator disposed on the head carrier and of a position sensor disposed on the housing frame is provided.

11. A device for positioning a magnetic head in a magnetic tape device, comprising: a housing frame; a threaded shaft on which the head carrier is mounted, said shaft having a spiral gearing including a nut on the threaded shaft associated therewith; one end of the shaft being retained in a first bearing attached to the housing frame and the other end of the shaft being retained in a second bearing; a bearing plate containing the second bearing and means for adjustably securing the bearing plate relative to the housing frame so as to align the head carrier; operating means for turning the spiral gearing being mounted on a support mount; attachment means being provided for movably positioning the support mount relative to the housing frame and locking the same in a desired position; and said shaft to which the head carrier is attached having a thread engageable with the spiral gearing such that when the spiral gearing is turned the shaft is axially displaced so as to move the head.

12. The device of claim 11 wherein a first spring-tension means is disposed between the spiral gearing and the first bearing and a second spring-tension means is active between the housing frame and the head carrier, stop means attached to the housing frame being engageable with abutment means on the head carrier to permit limited movement of the head carrier, said second spring means biasing the head carrier into a given position relative to said abutment.

* * * * *